United States Patent [19]
Gynn

[11] 3,848,177
[45] Nov. 12, 1974

[54] REGULATING CIRCUIT

[75] Inventor: George E. Gynn, Fort Wayne, Ind.

[73] Assignee: Syncro Corporation, Oxford, Mich.

[22] Filed: Apr. 26, 1973

[21] Appl. No.: 354,662

Related U.S. Application Data

[62] Division of Ser. No. 244,778, April 17, 1972.

[52] U.S. Cl.............. 322/73, 320/61, 320/71, 322/81, 322/91, 322/98
[51] Int. Cl. ............................................ H02p 9/26
[58] Field of Search........... 317/16; 320/71, 40, 39, 320/61; 322/33, 34, 81, 73, 91, 98, 84

[56] References Cited
UNITED STATES PATENTS

| | | | |
|---|---|---|---|
| 3,278,823 | 10/1966 | Ross | 322/91 X |
| 3,402,339 | 9/1968 | Abrams | 320/40 |
| 3,723,844 | 3/1973 | Cavil | 320/71 X |
| 3,757,199 | 9/1973 | Minks | 322/91 X |

*Primary Examiner*—James D. Trammell
*Attorney, Agent, or Firm*—Harness, Dickey & Pierce

[57] ABSTRACT

A solid state regulating circuit for a permanent magnet alternator which includes a switching element, preferably an SCR, for shunting the output winding of the alternator in response to a control signal to limit variations in power delivered to a load, and a control circuit for proving the control signal in accordance with the frequency and amplitude of the alternator output. More particularly, the control circuit may include a diode connected to the output windings of the alternator to provide a half wave signal to provide a monotonic intermediate signal of predetermined duration, and a second capacitor connecting the first capacitor and the gate of the SCR for providing the control signal for gating the SCR.

4 Claims, 11 Drawing Figures

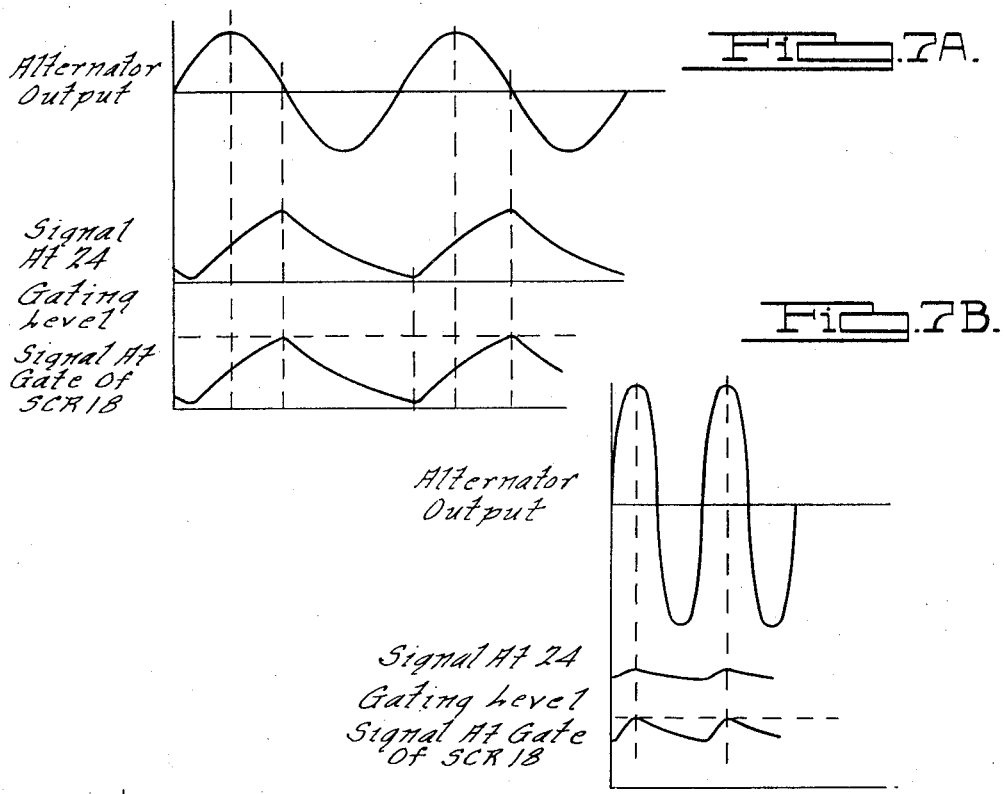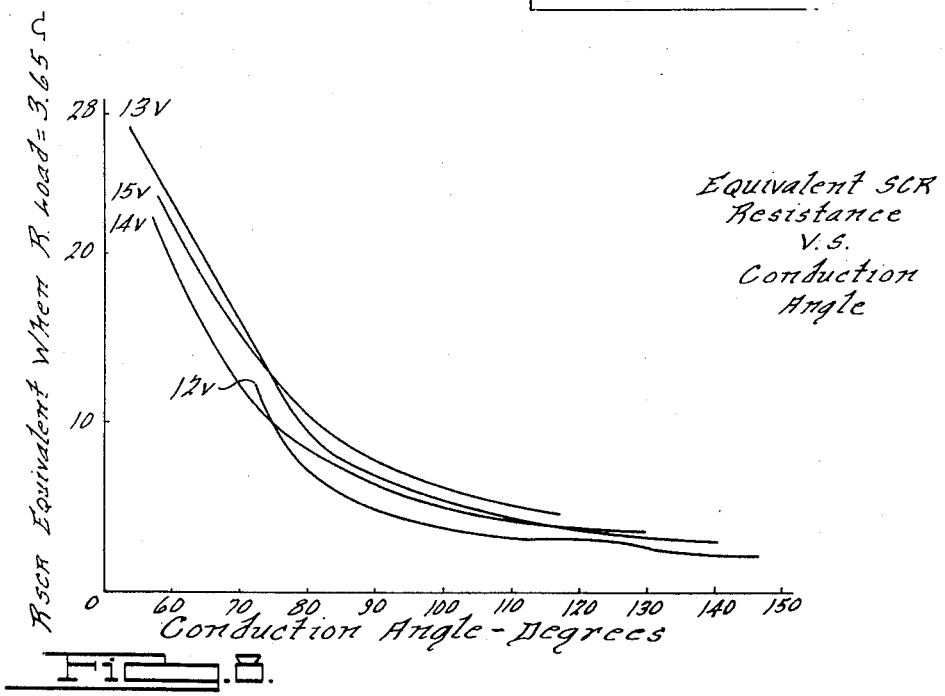

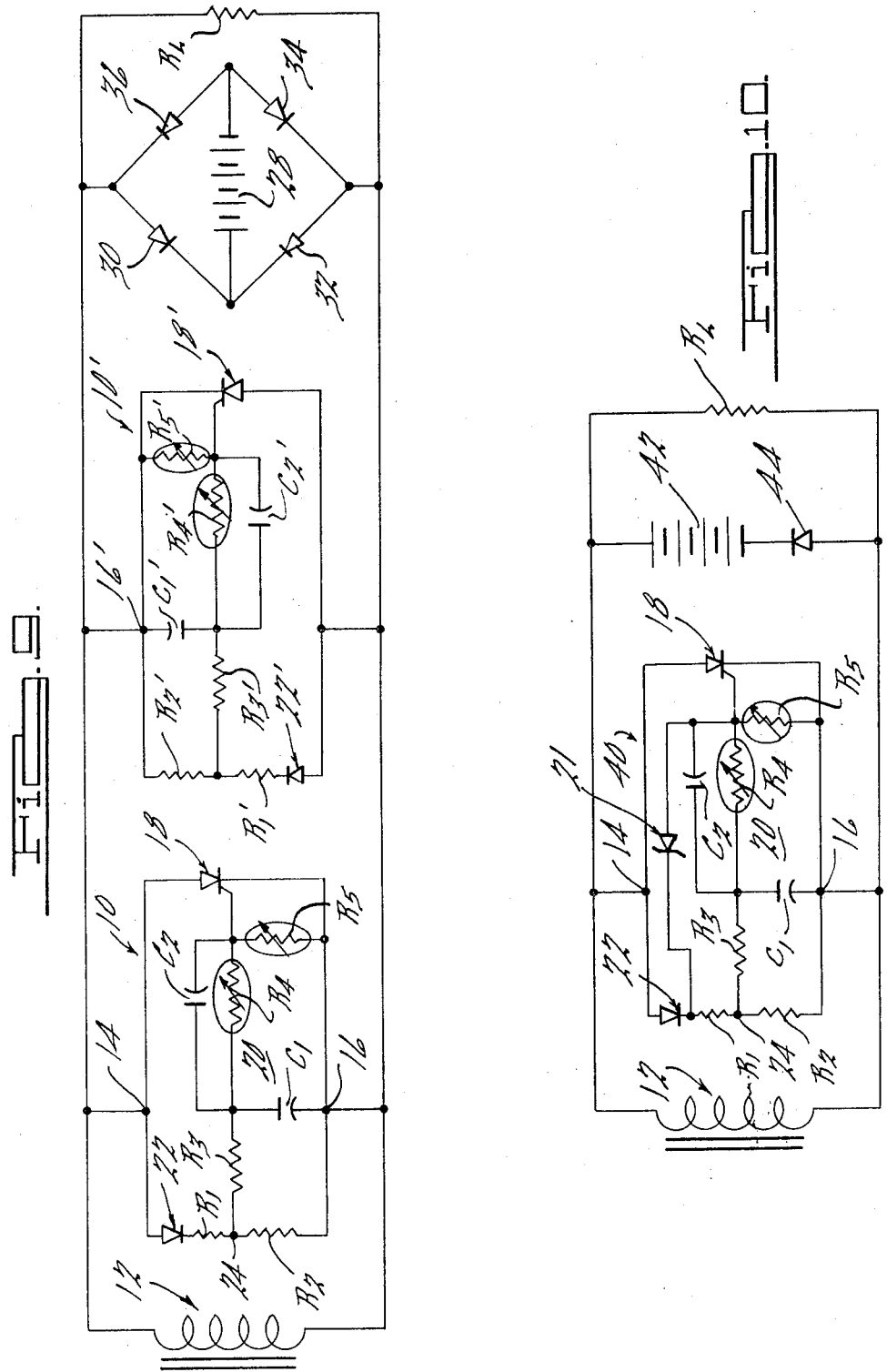

REGULATING CIRCUIT

This is a division of application Ser. No. 244,778, filed Apr. 17, 1972.

BACKGROUND AND SUMMARY OF THE INVENTION

Many recreational and utility vehicles in present use are provided with relatively low-cost permanent magnet alternators to supply electric power for the vehicle ignition, battery and for various electrical accessories such as the vehicle lights. Since permanent magnet alternators do not utilize field windings, and consequently, the field strength cannot be directly controlled in the usual manner by controlling the excitation of the field winding, the regulation of the output of the permanent magnet alternator is ordinarily accomplished by a shunting circuit, for example, as disclosed in the patent to Carmichael, et al., U.S. Pat. No. 3,270,268. More particularly, regulation of the alternator is accomplished by switching a relatively low impedance path across the output windings of the permanent magnet alternator. In the above Carmichael, et al. system, the voltage of the battery is sensed by a zener diode and the output of the permanent magnet alternator is controlled thereby to maintain the battery voltage at a predetermined level.

In some systems, batteries are not utilized and consequently, a readily utilizable voltage standard for regulating the alternator output is not available. Nonetheless, it may still be desirable to regulate the output of the alternator. For example, consider a vehicle having a permanent magnet alternator for providing electrical energy to the lighting lamps of the vehicle. It will be appreciated that it is desirable from a safety standpoint to limit the power to the lamp to prevent premature lamp burn-out. It is also desirable, in addition to the above safety consideration, to regulate the generator output to control the intensity of the light emitted by the lamp.

The present invention provides a solid state circuit of relatively few components for regulating the power output of an electrical power generator such as a permanent magnet alternator. The regulating circuit preferably includes a solid state switch such as an SCR which is connected across the output windings of the permanent magnet alternator in parallel with the load, and a control circuit connected to the gate of the SCR for varying the firing angle of the SCR so that the SCR represents a varying impedance in parallel with the load. The control circuit is connected to one terminal of the output windings of the permanent magnet alternator through a diode so as to receive positive half cycles of the alternator output waveform. The positive half cycles are delivered through a voltage-limiting resistor to a first capacitor which is connected to the other terminal of the generator output winding so as to integrate each positive half cycle, i.e., to provide an intermediate signal having a potential peak which lags the potential peak of the half cycle waveform at the cathode of the diode. For example, the circuit values may be selected so as to provide an intermediate signal at low alternator speeds having a potential peak which is shifted with respect to the potential peak of the half cycle waveform from 90° to slightly more than 160° of the alternator output cycle to provide a monotonic waveform for slightly more than 160° of the alternator cycle during which the SCR may be fired. Consequently, gradual regulation can be accomplished since the regulating circuit is capable of controlling the output power by shunting the output winding of the alternator for only a small portion of each alternator output cycle, i.e., for less than 20° thereof, rather than making large reductions on spaced cycles. Consequently, large power fluctuations which cause lamp flicker are avoided.

Insofar as the SCR is fired upon the attainment of a particular amplitude at its gate, and the amplitude of the gating signal is a function of the amplitude of the output of the alternator, the firing of the SCR is advanced in accordance with increases in the amplitude of the alternator output waveform, regardless of changes in the speed of the alternator. In this regard, the efficiency of an alternator increases with decreasing alternator temperature such that the amplitude of the alternator output increases with decreasing temperature although no change in alternator speed occurs.

The preferred regulating circuit also includes a parallel circuit of a resistor and a second capacitor which is connected between the first capacitor and the gate of the SCR. As the alternator output frequency increases, the rate of increase of the intermediate signal with respect to the a ternator cycle decreases, tending to delay the firing of the SCR while an advance in the firing of the SCR is called for since the alternator output power is increasing. The parallel circuit of the second capacitor and the resistor offsets this tendency by establishing a combined path to the gate for the intermediate signal which has a decreasing impedance as the frequency of the alternator output increases. This decreasing impedance with frequency increases the amplitude of the gating waveform so that the SCR is gated at increasingly earlier times with increasing frequency.

Also, as the alternator speed increases, the intermediate signal will experience a boost in DC offset, determined in accordance with the RC time constant of the circuit having the first capacitor, since the first capacitor will not have sufficient time to discharge. The latter effect is additive to the effect of the decrease in the impedance of the path from the first capacitor to the gate of the SCR to advance the firing of the SCR with increasing frequency.

In view of the above, it will be appreciated that changes in alternator output power, whether or not the result of changes in alternator speed, are accommodated. The regulator of the present invention responds to such changes so as to limit the variations in power delivered by the alternator to a load.

It can be seen from the above that a circuit of relatively few components is provided by this invention which effectively accomplishes power regulation of a permanent magnet alternator. It will be appreciated that the circuit is manufacturable at low cost using solid state components to provide a durable and reliable regulating circuit which is especially suitable for use in the harsh environment of a recreational vehicle.

BRIEF DESCRIPTION OF DRAWINGS

FIG. 7 is a graph illustrating a generalized control signal in comparison with a generalized alternator output signal for a first alternator speed.

FIG. 8 is a graph illustrating a generalized control signal in comparison with a generalized alternator output signal for a second higher alternator speed; and FIG. 9 is a graph illustrating the equivalent impedance of an intermittently shunting SCR as a function of the angle of conduction of the SCR with respect to the alternator output cycle.

FIGS. 10 and 11 are illustrations of additional embodiments of the present invention.

DETAILED DESCRIPTION OF THE PREFERRED EMBODIMENT

Figure 1:
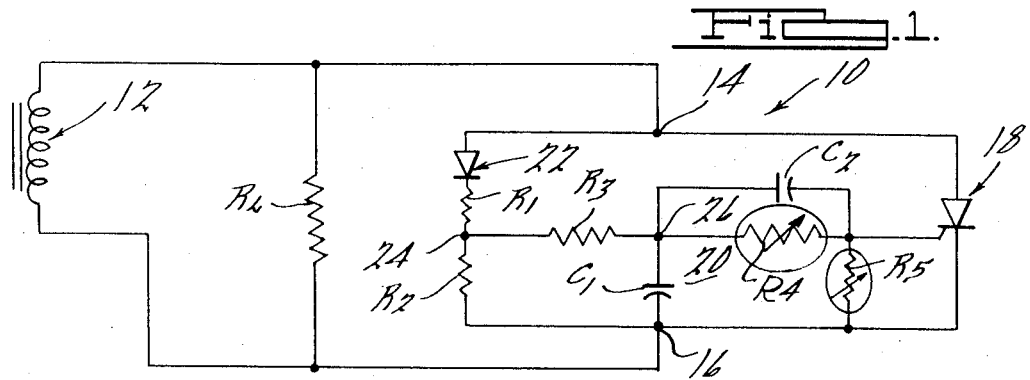
FIG. 1 is a circuit diagram of an exemplary regulating circuit according to the present invention.

In FIG. 1, a regulating circuit 10 is illustrated which is connected across the windings 12 of a permanent magnet alternator at terminals 14 and 16. The alternator may be along the lines of that disclosed in the aforementioned patent to Carmichael, et al. A load $R_L$, which may be the tungsten filament of an illumination lamp, is connected in parallel with the regulating circuit 10 and the output windings 12. The regulating circuit 10 includes an SCR 18 and a control circuit 20, each of which is connected directly between terminals 14 and 16. The SCR 18 provides a shunt path for the permanent magnet generator windings 12 when the SCR 18 is conductive.

The control circuit 20 includes a diode 22 which is connected to one terminal 14 to provide the positive half cycles of the alternator output waveform at its cathode which are received by a voltage divider network comprising resistors R1 and R2 so as to provide positive half cycles of reduced potential at terminal 24. A first waveform modifying network comprising resistor R3 and Capacitor C1 provides an intermediate waveform at a terminal 26 having a configuration and purpose to be described in detail hereinafter. A second waveform modifying network comprising a resistor R4 and capacitor C2 connects the terminal 26 to the gate of the SCR 18 to provide a gating signal for the SCR 18 which will also be described in greater detail hereinafter. An adjustable resistor R5 establishes an appropriate control circuit output impedance which matches the gate input impedance of the particular SCR used. The resistor R5 is also used to fine tune the regulating circuit 10 after assembly, as will also be more fully described hereinafter.

To aid in understanding of the operation of the regulating circuit 10 of FIG. 1, the various alternator and load operating conditions, which influence the operation of the regulating circuit, will be initially set forth.

Figure 2:
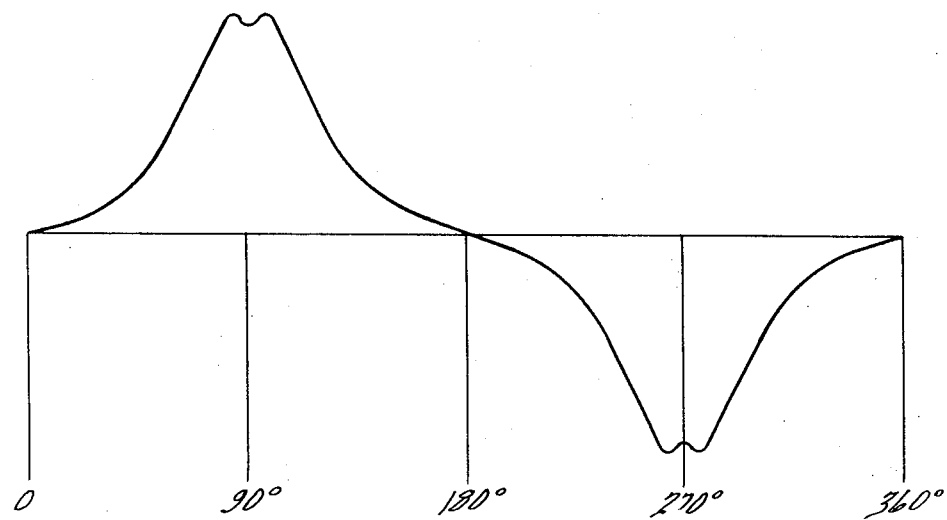
FIG. 2 is a graph illustrating a typical output waveform of a permanent magnet alternator.

In FIG. 2, a typical output waveform of a low cost permanent magnet alternator is illustrated. As can be seen in FIG. 2, the output waveform is distinctly non-sinusoidal and has significant energy in the odd harmonics. It can be seen that the initial positive monotonic portion of the curve occurs for less than the first 90° of the operating cycle of the alternator. In fact, the output waveform of a typical permanent magnet alternator is even more complex than suggested by the chart in FIG. 2 since the configuration of the waveform varies with the alternator speed, i.e., frequency. Also, the output waveform generally increases in amplitude as alternator speed increases.

Figure 3:
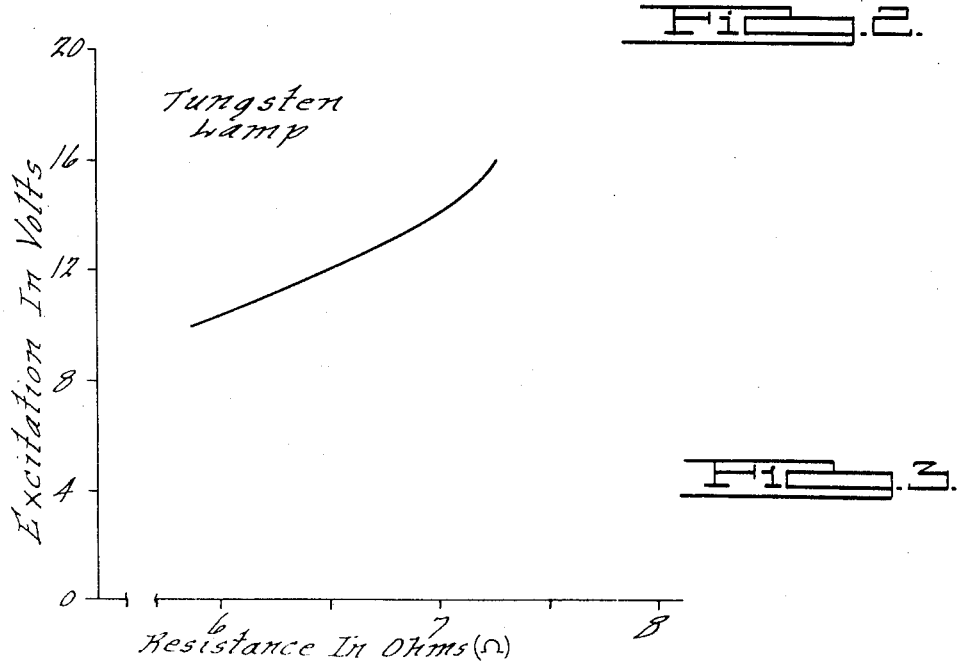
FIG. 3 is a graph illustrating the change in the resistance of a tungsten filament lamp as a function of excitation.

The operation of a regulating circuit for a permanent magnet alternator may also be dependent upon changes in the load impedance. For example, as illustrated in FIG. 3, the tungsten filament lamp has a positive temperature coefficient of resistance with excitation voltage so that the resistance of the lamp filament will increase as the voltage applied to the lamp filament increases.

Figure 4:
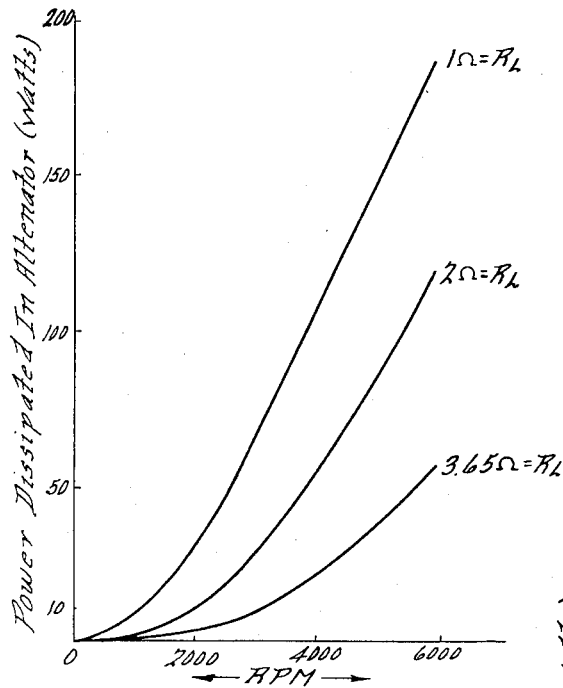
FIG. 4 is a graph illustrating the power dissipated in a permanent magnet alternator as a function of alternator speed.
Figure 5:
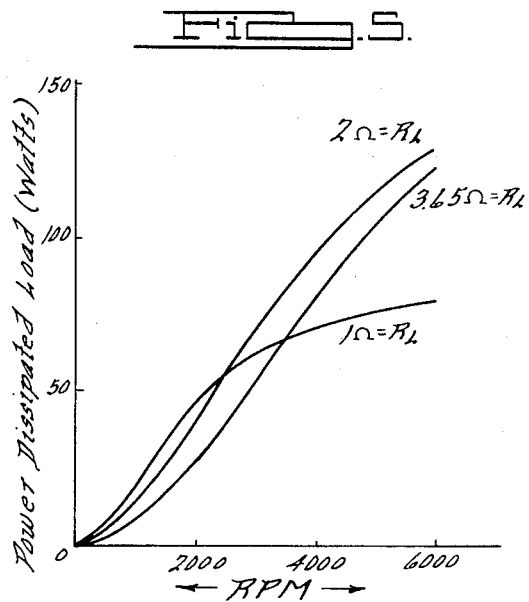
FIG. 5 is a graph illustrating the power dissipated in a resistive load as a function of alternator speed.
Figure 6:
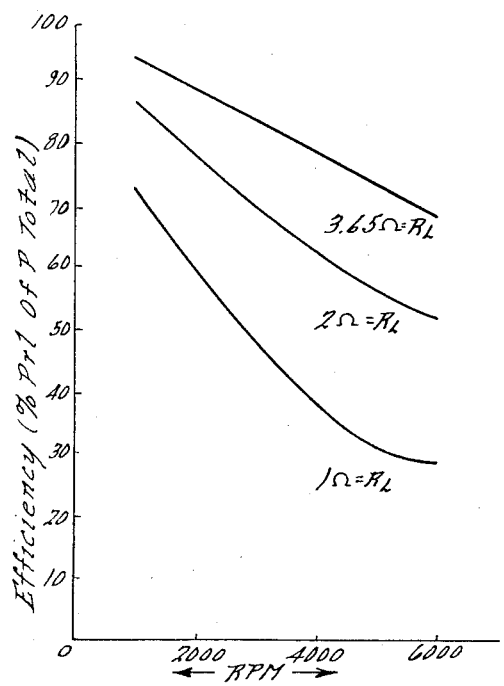
FIG. 6 is a graph illustrating alternator efficiency as a function of alternator speed.

With reference now to FIG. 4, the next factor to consider is the power dissipated in the alternator. Since permanent magnet alternators are subject to frequency-dependent losses in the iron and magnet structure, the air gap, the windings, and are further subject to losses due to stray reactances, the output power of the alternator does not vary linearly with alternator speed. Typical variations in the power losses of permanent magnet alternators as a function of speed are shown in FIG. 4. As can be seen in the figure, the losses within the alternator increase relatively rapidly with alternator speed, especially for low load impedances. Consequently, as seen in FIG. 5, the power provided to the load decreases with alternator speed. Therefore, as seen in FIG. 6, the efficiency of the alternator, defined as the percent power dissipated in the load with respect to the total power dissipated in the load and the alternator, decreases with increases in alternator speed.

In summary of the above, the configuration or shape of the alternator output waveform, the amplitude of the alternator output waveform, the load impedance, and the internal alternator impedance, vary with alternator speed. Each of these variations affect the power delivered to the load. Consequently, if power delivered to the load is to be closely regulated, each of the above variations must be accommodated by the alternator regulating circuit.

The operation of the regulating circuit 10 of FIG. 1 will be considered in the light of the graphs of FIGS. 7A and 7B which are illustrative of generalized operational waveforms. It is cautioned that the waveforms of FIGS. 7A and 7B are not fully representative of true waveforms, but rather, have been simplified to facilitate an understanding of the present invention. As one example, it will be readily apparent that the sinusoidal waveform shown in each of the figures, incorporated to represent the alternator output waveform, would more closely resemble the waveform shown in FIG. 2.

As previously stated, the potential at the cathode of the diode 22 represents the positive half cycles of the output waveform. This potential is reduced by the voltage divider network comprising resistors R1 and R2 to some value less than full value, for example, approximately 75 percent of the full value. The first signal modifying circuit comprising the resistor R3 and the capacitor C1 integrates the reduced positive half cycle waves so that the peak of the intermediate signal at terminal 26 lags the peak of the half cycle waves at the cathode of the diode 22. The wave at terminal 26 is represented in FIG. 7A as the lower waveform which is monotonic and increasing for approximately 162° of the alternator cycle. Consequently, the initial positive monotonic portion of the intermediate signal at terminal 26 is extended substantially over that of the signal at the cathode of the gate 22.

Considering for illustrative purposes that a network without reactive impedance connects the terminal 26 to the gate of the SCR 18 so that the lower signal of FIG. 7A is provided to the gate of the SCR 18, it can be seen that a monotonic signal, i.e., one which is suitable for gating the SCR 18, is available for a sufficient portion of the alternator output cycle so that the output can be regulated by shunting the output through the SCR 18 for as little as approximately 20° of the alternator output cycle. If it were not for the lag in the occurrence of the peak of the intermediate signal at terminal 26, it would be necessary to shunt the alternator output for a minimum of 90° of the alternator cycle so that the minimum power regulation which could be effected would be at a reduction in the power output of the alternator consequent the shunting of at least 90° of the alternator cycle. Accordingly, a more gradual decrease in the power output of the alternator can be accomplished with the circuit of the present invention.

Still considering the terminal 26 as being connected to the gate of the SCR 18 through a network without reactive impedance, it will be appreciated that as the amplitude of the output waveform of the alternator increases, the amplitude of the signal at terminal 26 will increase so as to reach the gating level of the SCR at an earlier point in time, and consequently, so as to advance the firing of the SCR to correspondingly reduce the power delivered to the load. Therefore, power regulation is accomplished as a function of the amplitude of the alternator output. The response of the regulating circuit 10 to the amplitude of the alternator output waveform can be conveniently adjusted by adjusting the values of the voltage divider resistors R1 and R2 to establish the desired relationship between alternator output potential and the gating potential of the SCR 18.

With increasing frequency, the lag of the peak of the signal at terminal 26 with respect to the half cycles at the cathode of the diode 22 increases somewhat. Also, the attenuation of the signal increases since the impedance of the signal path through the capacitor C1 decreases. However, although the attenuation of the signal is increased, the actual diminution of the amplitude of the signal at the terminal 26 is offset by the increasing amplitude of the alternator output waveform. Additionally, the RC time constant of the circuit having the capacitor C1 may be sufficiently long such that as the frequency increases, the capacitor C1 will not fully discharge before the next charge cycle is initiated. Consequently, a DC offset will occur which increases with increasing frequency to actually increase the intermediate signal at terminal 26 with increasing frequency. However, the DC offset does not provide an advance in the firing angle of the SCR 18 which is sufficient to offset the increasing power output of the alternator with alternator speed.

The second signal modifying circuit comprising the capacitor C2 and resistor R4 is used to advance the peak of the waveform at the gate of the SCR 18 with increasing frequency to fire the SCR 18 at increasingly earlier times to accommodate increases in the power output of the alternator with alternator speed. More specifically, the parallel connection of the capacitor C2 with the resistor R4 increasingly reduces the impedance of the path from the terminal 26 to the gate of the SCR 18 with increasing frequency whereby the signal level at the gate is increased. As can be seen in FIG. 7B, the firing point is advanced to approximately 90° of the operating cycle of the alternator and will continue to advance with increasing alternator frequency to nearly 45° of the alternator output cycle.

When the gate fires at the peak shown in FIGS. 7A and 7B, the potential supplied to the regulating circuit is reduced by the shunting of the alternator output windings so that substantially no further increase in gate signal occurs. If it were not for the firing of the gate at that point, a slight increase in signal may have occurred before the charging of the capacitor C1 ceases, i.e., when the potential supplied to the capacitor C1 is no longer greater than the potential stored at the capacitor C1.

When the SCR 18 fires, the output of the alternator is reduced substantially to zero so that the capcitor C1 begins to discharge through resistors R2 and R5. The discharge is at a rate established by the values of the capacitor C1 and the resistors R2 through R5 so as to establish the downward slope in the gate signal curve of FIGS. 7A and 7B. The capacitor will continue to discharge until it again is supplied with a potential from the alternator 12 which is greater than its instantaneous charge.

As will be apparent from the previous discussion, the values of capacitor C1 and the resistor R3 are selected in combination with the other circuit components to provide a time constant which, at the lower operating frequencies of the alternator cause the peak of the intermediate signal at the terminal 26 to occur at nearly 180° of the alternator operating cycle, for example, at approximately 162° of the alternator cycle. The values of the capacitor C2 and the resistor R4 are selected to provide an advance in the firing of the SCR 18 with increasing frequency in accordance with the operating parameters of the particular alternator and the characteristics of the load so that the power delivered to the load remains relatively constant. The resistor R5, as previously stated, is generally selected to provide an appropriate control circuit impedance at the gate of the SCR 18. Additionally, the resistor R5 is adjustable so as to finely tune the regulating circuit after assembly so that a high degree of accuracy in regulation is obtained. Since the gate of the SCR 18 has a relatively low impedance, preferably, the resistors R1 through R5 have relatively low values of resistance.

As will be appreciated in view of the above description, the regulating circuit 20 varies the angle at which the SCR 18 fires with respect to the alternator cycle. This variation in conduction angle appears to the alternator like a varying load which is in parallel with the normal load. More specifically, as the generator output increases, the varying load increases, i.e., its impedance decreases, thus holding the power available to the normal load relatively constant. As can be best seen in FIG. 8, the SCR 18 equivalent impedance falls off rapidly as the conduction angle at firing increases to approximately 90° and falls off less rapidly thereafter. Referring now to FIG. 5, it can be seen that the power dissipated in the load when the alternator is unregulated rises rapidly initially and less rapidly as alternator speed increases. Consequently, it can be seen how the control circuit 20 can be adjusted such that the SCR equivalent impedance decreases rapidly initially in accordance with the rapid initial power increase at the alternator, and less rapidly with the less rapid power increase at the alternator as the alternator speed increases so as to be matched to the alternator power characteristics so that the load receives substantially constant power.

In an exemplary operating embodiment of the present invention, the following circuit values and components were used:

| Name | No. or value |
|---|---|
| Generator | 122 Watt, 12 Volt, 12 pole, mfg. by Syncro Corp. |
| Load | two General Electric 4445 bulbs at 35 watts each bulb and two General Electric 1157 at 26.9 watts each bulb |
| Diode 22 | 1N 4004 |
| R1 | 1500Ω |
| R2 | 1000Ω |
| R3 | 500Ω |
| C1 | 47μ+ |
| C2 | 1μ+ |
| R4 | 330Ω |
| R5 | 40–125Ω |
| SCR 18 | General Electric C 122 Bx 23 |

In the above exemplary embodiment, the resistors R3, R4 and R5 were provided by depositing a resistive, thick film ink on a ceramic substrate. The resistive film of the resistors R4 and R5 have selected temperature coefficients of resistance so as to compensate for variations in the firing sensitivity of the SCR 18 with temperature so that the SCR 18 will fire at a given potential at terminal 26 substantially regardless of variations in the operational conditions of the SCR 18 which affect its temperature. In this regard, the resistive film of the resistor R5 has a negative temperature coefficient of resistance while the resistive film of the resistor R4 has a positive temperature coefficient of resistance. Since the resistor R4 is essentially in series with the gate of the SCR 18 and the resistor R5 is essentially in shunt with the gate of the resistor of the SCR 18, the effects of the temperature coefficients of resistance of the resistors and additive, i.e. effect of each on the firing sensitivity of the SCR 18 is in the same sense. If the temperature sensitivity of the SCr 18 is sufficiently small, either the resistor R4 or the resistor R5 may have a zero temperature coefficient of resistance.

In the calibration of the regulator 10, the resistor R5 is first trimmed so as to provide a predetermined firing sensitivity of the SCR 18 in volts and milliamperes at the junction of the resistors R4 and R5. Thereafter, the resistor R4 is trimmed so as to provide a predetermined firing sensitivity of the SCR 18 at the terminal 26.

In FIG. 9, a full wave regulator is illustrated in combination with a resistive load $R_L$ which may be a lighting lamp and a battery 32 which is connected to the output winding 12 of the alternator by a full wave rectifying bridge consisting of diodes 30–36. The full wave regulator essentially comprises a pair of half wave regulators 10 and 10' which are connected in parallel and in opposite polarity relationship. Each of the regulators 10 and 10' are essentially as described with respect to the regulator 10 of FIG. 1 except that the values of the components are adjusted so that the shunting of each half cycle occurs at a time later than the time of shunting of a half wave regulator in accordance with the increased regulating effect provided by full wave regulation. As can be seen in the figure, the regulator 10 is connected to the winding 12 to shunt on one half cycle of the alternator output while the regulator 10' is connected to the winding 12 to shunt on the other half cycle of the alternator output.

In FIG. 10, a voltage regulator 40 according to this invention is illustrated in combination with a battery 42, a rectifying diode 44, and lighting or lamp load $R_L$. The regulator 40 is like the regulator 10 of FIG. 1 except that it additionally includes a Zener diode Z1 to provide high voltage transient protection. For example, high voltage transients may occur upon opening of a starter motor switch or other load switch. As can be seen in the figure, the Zener diode Z1 is connected between the cathode of the diode D1 and the gate of the SCR 18 so that a voltage exceeding the Zener diode voltage, for example, 200 volts, at the cathode of the diode D1 will cause substantially instantaneous firing of the SCR 18 so as to absorb the transient in the SCR 18.

A Zener diode is selected which has a breakdown voltage which is lower than the peak voltage rating of all other devices subject to excess transient voltage damage. Consequently, solid state devices or other devices connected to otherwise receive the voltage transient are protected. It will be appreciated that a pair of the voltage regulators 40 having the high voltage transient protecting diode $Z_1$ may be used in a full wave regulating circuit as shown in FIG. 9 so that both positive and negative high voltage transients are accommodated.

Although the regulating circuit of the present invention has been described in combination with a permanent magnet alternator, those skilled in the art will appreciate that the teachings herein may be applied to other types of electrical power generators, and especially those providing an output waveform having a cyclically variable amplitude. For example, the regulator of this system may be used to regulate the fluctuating DC from a rectifying circuit which is connected to the output windings of a permanent magnet alternator. By way of illustration, the regulating circuit 10 may be connected to the output of a full wave bridge rectifying circuit which is connected to opposite ends of an alternator output winding, or may be connected to the cathodes of a pair of diodes connected to the opposite ends of the output winding of a permanent magnet alternator having a grounded center tap.

Considering the complexity of the parameters influencing the power delivered to the load which change with alternator speed, and considering the changes in alternator output which occur even without changes in alternator speed, it will be well appreciated that the above circuit uses unexpectedly few components. Moreover, it can be seen that the control circuit is fully solid state, and consequently, can be built for the rugged environment of snowmobiles and other recreational vehicles simply by encapsulating the components. It will also be appreciated that due to the wide range of regulation provided by the regulating circuit 10 of this invention, large power fluctuations are avoided such that power ripple, as would cause lighting flicker, are minimized.

It will be appreciated by those skilled in the art that the preferred embodiment of the invention disclosed herein is susceptible to modification, variation and change without departing from the proper scope or fair meaning of the subjoined claims.

I claim:

1. A method for calibrating a regulating circuit for a permanent magnet alternator utilizing an SCR having a gate electrode comprising the steps of:

depositing a resistive film which connects with said gate electrode having a temperature coefficient of resistance which is selected in accordance with the firing sensitivity of said SCR; and adjusting the value of said resistor generally at a predetermined temperature of said SCR by removal of a portion of said resistive film so as to increase the resistance of said resistive film so that said SCR fires substantially at a predetermined gate signal level at said predetermined temperature.

2. A method for calibrating a regulating circuit for a permanent magnet alternator utilizing an SCR having a gate electrode comprising the steps of:

depositing first and second resistive films which connect with said gate electrode with each of said resistive films having a temperature coefficient of resistance which is selected in accordance with the firing sensitivity of said SCR; and adjusting the value of said resistive films generally at a predetermined temperature of said SCR by removal of a portion of said resistive films so as to increase the resistance of said resistive films so that said SCR fires substantially at a predetermined gate signal level at said predetermined temperature.

3. A method for calibrating a regulating circuit for a permanent magnet alternator utilizing an SCR having a gate electrode comprising the steps of:

depositing a first resistive film in series with said gate electrode of said SCR and a second resistive film in parallel with said gate electrode of said SCR, each of said resistive films having a temperature coefficient of resistance which is selected in accordance with the firing sensitivity of said SCR; and adjusting the value of resistive films generally at a predetermined temperature of said SCR by removal of a portion of said resistive films so as to increase the resistance of said resistive films so that said SCR fires substantially at a predetermined gate signal level at said predetermined temperature.

4. The method according to claim 3 wherein said SCR has a cathode and wherein said step of depositing said second resistive film includes the step of depositing said second resistive film so as to connect said gate and said cathode.

* * * * *

UNITED STATES PATENT OFFICE
CERTIFICATE OF CORRECTION

Patent No. 3,848,177   Dated November 12, 1974

Inventor(s) George E. Gynn

It is certified that error appears in the above-identified patent and that said Letters Patent are hereby corrected as shown below:

Line 10 of the Abstract, after "signal" insert --, a first capacitor for integrating the half wave signal--. Column 2, line 25, "a tenator" should be --alternator--. Column 7, line 39, "and" should be --are--; line 41, "SCr" should be --SCR--.

Signed and sealed this 4th day of February 1975.

(SEAL)
Attest:

McCOY M. GIBSON JR.
Attesting Officer

C. MARSHALL DANN
Commissioner of Patents